US012351778B2

(12) United States Patent
Backer et al.

(10) Patent No.: US 12,351,778 B2
(45) **Date of Patent: *Jul. 8, 2025**

(54) LAUNDRY DETERGENT FORMULATION WITH BIODEGRADABLE ANTIREDEPOSITION AGENT

(71) Applicants: Dow Global Technologies LLC, Midland, MI (US); Dow Silicones Corporation, Midland, MI (US); Rohm and Haas Company, Collegeville, PA (US)

(72) Inventors: Scott Backer, Phoenixville, PA (US); Randara Pulukkody, Lansdale, PA (US); John B. Case, Jr., Perkasie, PA (US); Saugata Nad, Brussels (BE); Sangeeta Sanjeev Patel, Mumbai (IN)

(73) Assignees: Dow Global Technologies LLC, Midland, MI (US); Rohm and Haas Company, Collegeville, PA (US); Dow Silicones Corporation, Midland, MI (US)

( * ) Notice: Subject to any disclaimer, the term of this patent is extended or adjusted under 35 U.S.C. 154(b) by 308 days.

This patent is subject to a terminal disclaimer.

(21) Appl. No.: 17/924,044

(22) PCT Filed: Jun. 18, 2021

(86) PCT No.: PCT/US2021/037972

§ 371 (c)(1),
(2) Date: Nov. 8, 2022

(87) PCT Pub. No.: WO2021/262535

PCT Pub. Date: Dec. 30, 2021

(65) Prior Publication Data

US 2023/0174899 A1 Jun. 8, 2023

(30) Foreign Application Priority Data

Jun. 24, 2020 (IN) ............................ 202041026668

(51) Int. Cl.

*C11D 3/00* (2006.01)
*C11D 1/22* (2006.01)
*C11D 3/37* (2006.01)

(52) U.S. Cl.

CPC .............. *C11D 3/0036* (2013.01); *C11D 1/22* (2013.01); *C11D 3/3757* (2013.01); *C11D 2111/12* (2024.01)

(58) Field of Classification Search

CPC ....... C11D 3/0036; C11D 1/22; C11D 3/3757; C11D 2111/12

See application file for complete search history.

(56) References Cited

U.S. PATENT DOCUMENTS

| | | | |
|---|---|---|---|
| 4,797,223 | A | 1/1989 | Amick et al. |
| 5,191,048 | A | 3/1993 | Swift et al. |

(Continued)

FOREIGN PATENT DOCUMENTS

| | | | |
|---|---|---|---|
| EP | 0497611 | A1 | 8/1992 |
| WO | 2019217082 | A1 | 11/2019 |

OTHER PUBLICATIONS

Sibilia, "A Guide to Materials Characterization and Chemical Analysis", VCH, 1988, pp. 81-84.

(Continued)

*Primary Examiner* — Angela C Brown-Pettigrew
*Assistant Examiner* — Mustafa Humbel Ahmed

(57) ABSTRACT

A laundry detergent formulation is provided including a detergent surfactant; a builder; a filler and an antiredeposition agent, including: 10 to 65 wt % of structural units of formula I (I)

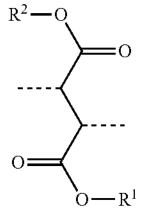

where each $R^1$ and $R^2$ is independently selected from a hydrogen and a $C_{1-3}$ alkyl group; 10 to 80 wt % of structural units of formula II (II)

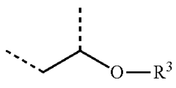

wherein where each $R^3$ is independently selected from a hydrogen and a-C (O) $CH_3$ group; and 10 to 65 wt % of structural units of formula III (III)

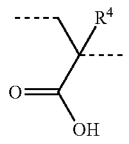

where each $R^4$ is independently selected from a hydrogen and a —$CH_3$ group; and (Continued)

where at least one of $R^1$ and $R^2$ is a $C_{1-3}$ alkyl group in at least 1 mol % of the structural units of formula I in the antiredeposition agent; where the antiredeposition agent has a lactone end group and where the antiredeposition agent has a weight average molecular weight of 1,500 to 6,000 Daltons.

9 Claims, No Drawings

(56) References Cited

U.S. PATENT DOCUMENTS

| | | | | |
|---|---|---|---|---|
| 5,830,956 | A | 11/1998 | Stockhausen et al. | |
| 5,912,406 | A * | 6/1999 | Black | C11D 1/835<br>510/342 |
| 6,458,752 | B1 | 10/2002 | Rodrigues | |

OTHER PUBLICATIONS

Yau, "Modem Size Exclusion Chromatography", Wiley-Interscience, 1979.

* cited by examiner

LAUNDRY DETERGENT FORMULATION WITH BIODEGRADABLE ANTIREDEPOSITION AGENT

The present invention relates to a laundry detergent formulation. In particular, the present invention relates to a laundry detergent formulation incorporating a detergent surfactant, a builder, and an antiredeposition agent, comprising: 10 to 65 wt %, based on dry weight of the antiredeposition agent, of structural units of formula I (I)

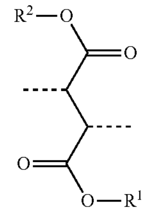

wherein each $R^1$ and $R^2$ is independently selected from a hydrogen and a $C_{1-3}$ alkyl group; 10 to 80 wt %, based on dry weight of the antiredeposition agent, of structural units of formula II (II)

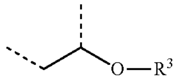

wherein each $R^3$ is independently selected from a hydrogen and a —C(O)$CH_3$ group; and 10 to 65 wt %, based on dry weight of the antiredeposition agent, of structural units of formula III (III)

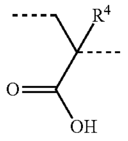

wherein each $R^4$ is independently selected from a hydrogen and a —$CH_3$ group; and wherein at least one of $R^1$ and $R^2$ is a $C_{1-3}$ alkyl group in at least 1 mol % of the structural units of formula I in the antiredeposition agent; wherein the antiredeposition agent has a lactone end group and wherein the antiredeposition agent has a weight average molecular weight of 1,500 to 6,000 Daltons.

Laundry detergents providing excellent overall cleaning are desirable to consumers. Such laundry detergents typically include surfactants among other components to deliver the consumer desired cleaning benefits. Nevertheless, increasing sensitivity for the environment and rising material costs, a move to reduce the utilization of surfactants in laundry detergents is growing. Consequently, detergent manufactures are seeking ways to reduce the amount of surfactant per unit dose of the laundry detergent while maintaining overall cleaning performance.

One powder detergent composition is described by Rodrigues in U.S. Pat. No. 6,458,752. Rodrigues discloses a powder detergent composition comprising at least one surfactant and builder and from 0.1 to about 75 weight percent, based on total weight of the powder detergent composition, of a water-soluble or water-dispersible polymer having pendant acid functionality and a terminal fragment of a chain transfer agent, wherein the polymer is the polymerization product of 60 to 95 weight percent of an ethylenically unsaturated acid monomer and 5 to 40 weight percent of a $C_3$ to $C_{24}$ chain transfer agent, wherein the weight percents are based on the weight of the total monomer and chain transfer agent.

Notwithstanding there remains a need for new antiredeposition agents for use in laundry detergent formulations. In particular, there remains a need for new antiredeposition agents for use in laundry detergent formulations, wherein the antiredeposition agents provide suitable primary cleaning and antiredeposition performance in combination with having enhanced biodegradability.

The present invention provides a laundry detergent formulation, comprising: a detergent surfactant; a builder; and an antiredeposition agent, wherein the antiredeposition agent is a polymer comprising: (a) 10 to 65 wt %, based on dry weight of the antiredeposition agent, of structural units of formula I (I)

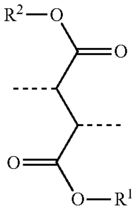

wherein each $R^1$ and $R^2$ is independently selected from a hydrogen and a $C_{1-3}$ alkyl group; (b) 10 to 80 wt %, based on dry weight of the antiredeposition agent, of structural units of formula II (II)

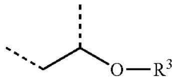

wherein each $R^3$ is independently selected from a hydrogen and a —C(O)$CH_3$ group; and (c) 10 to 65 wt %, based on dry weight of the antiredeposition agent, of structural units of formula III (III)

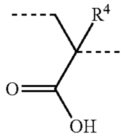

wherein each $R^4$ is independently selected from a hydrogen and a —$CH_3$ group; and wherein at least one of $R^1$ and $R^2$ is a $C_{1-3}$ alkyl group in at least 1 mol % of the structural units of formula I in the antiredeposition agent; wherein the antiredeposition agent has a lactone end group and wherein the antiredeposition agent has a weight average molecular weight of 1,500 to 6,000 Daltons.

The present invention provides a method of washing a soiled fabric article, comprising: providing a soiled fabric article; providing a laundry detergent formulation according to the present invention; providing a wash water; and applying the wash water and the laundry detergent formulation to the soiled fabric article to provide a cleaned fabric article.

DETAILED DESCRIPTION

The antiredeposition agent of the present invention exhibits its desirable biodegradability properties. When incorporated in laundry detergent formulations, the antiredeposition agent of the present invention as particularly described herein surprisingly give good primary detergency and antiredepositon performance relative to conventional antiredeposition agents, but while also providing biodegradability that is desired to facilitate formulation of more sustainable laundry detergent formulations. In addition, the antiredeposition agent of the present invention is also surprisingly hard water tolerant, unlike conventional maleic acid residue containing polymers that are susceptible to complexation with $Ca^{2+}$ ions present in hard water, leading to flocculation and precipitation.

Unless otherwise indicated, ratios, percentages, parts, and the like are by weight. Weight percentages (or wt %) in the composition are percentages of dry weight, i.e., excluding any water that may be present in the composition. Percentages of monomer units in the polymer are percentages of solids weight, i.e., excluding any water present in a polymer emulsion.

As used herein, unless otherwise indicated, the terms "weight average molecular weight" and "Mw" are used interchangeably to refer to the weight average molecular weight as measured in a conventional manner with gel permeation chromatography (GPC) and conventional standards, such as polystyrene standards. GPC techniques are discussed in detail in Modem Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Weight average molecular weights are reported herein in units of Daltons.

The term "ethylenically unsaturated" as used herein and in the appended claims describes molecules having a carbon-carbon double bond, which renders it polymerizable. The term "multi-ethylenically unsaturated" as used herein and in the appended claims describes molecules having at least two carbon-carbon double bonds.

As used herein the term "(meth)acrylic" refers to either acrylic or methacrylic.

The term "phosphate-free" as used herein and in the appended claims means compositions containing ≤1 wt % (preferably, ≤0.5 wt %; more preferably, ≤0.2 wt %; still more preferably, ≤0.01 wt %; yet still more preferably, ≤0.001 wt %; most preferably, less than the detectable limit) of phosphate (measured as elemental phosphorus).

The term "structural units" as used herein and in the appended claims refers to the remnant of the indicated monomer; thus a structural unit of (meth)acrylic acid is illustrated:

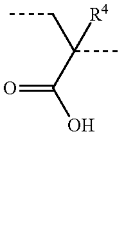

wherein the dotted lines represent the points of attachment to the polymer backbone and where $R^4$ is a hydrogen for structural units of acrylic acid and a $—CH_3$ for structural units of methacrylic acid.

Preferably, the laundry detergent formulation of the present invention is selected from a liquid laundry detergent formulation, a powder laundry detergent formulation and a laundry bar. Preferably, the laundry detergent formulation of the present invention is selected from at least one of a liquid laundry detergent formation and a powder laundry detergent formulation provided in a monodose format. More preferably, the laundry detergent formulation of the present invention is an anhydrous powder laundry detergent formulation containing <1 wt % (preferable, <0.1 wt %; more preferably, <0.01 wt %; most preferably, <0.001 wt %) water.

Preferably, the laundry detergent formulation (preferably, powder laundry detergent formulation) of the present invention, comprises: a detergent surfactant (preferably, 5 to 50 wt % (preferably, 6 to 30; more preferably, 7 to 20; most preferably, 8 to 18), based on weight of the laundry detergent formulation, of the detergent surfactant); a builder (preferably, 20 to 75 wt % (preferably, 20 to 65 wt %; more preferably, 25 to 50 wt %; most preferably, 27 to 35 wt %), based on weight of the laundry detergent formulation, of the builder); a filler (preferably, 0 to 74.09 wt % (preferably, 5 to 70 wt %; more preferably, 28.5 to 65 wt %; most preferably, 53.9 to 62 wt %), based on weight of the laundry detergent formulation, of the filler); and an antiredeposition agent (preferably, 0.01 to 5 wt % (preferably, 0.05 to 2 wt %; more preferably, 0.1 to 1.5 wt %; most preferably, 0.4 to 1.1 wt %), based on weight of the laundry detergent formulation, of the antiredeposition agent), wherein the antiredeposition agent is a polymer comprising: (a) 10 to 65 wt % (preferably, 20 to 60 wt %; more preferably, 20 to 50 wt %; still more preferably, 25 to 40 wt %; most preferably, 25 to 35 wt %) (preferably, ≥20 wt %; more preferably, ≥25 wt %; preferably, ≤60 wt %; more preferably, ≤50 wt %; still more preferably, ≤40 wt %; most preferably, ≤35 wt %), based on dry weight of the antiredeposition agent, of structural units of formula I;

(I)

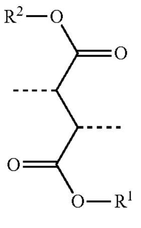

wherein each $R^1$ and $R^2$ is independently selected from a hydrogen and a $C_{1-3}$ alkyl group (preferably, a hydrogen and a $C_{2-3}$ alkyl group; more preferably, a hydrogen and a $C_3$ alkyl group) (preferably, wherein at least one of $R^1$ and $R^2$ is a $C_3$ alkyl group in at least 1 mol % of the structural units of formula I in the antiredeposition agent); (b) 10 to 80 wt % (preferably, 15 to 75 wt %; more preferably, 20 to 60 wt %; most preferably, 30 to 50 wt %) (preferably, ≥20 wt %; more preferably, ≥25 wt %; still more preferably, ≥30 wt %; most preferably, ≥35 wt %; preferably, ≤70 wt %; more preferably, ≤60 wt %; most preferably, ≤50 wt %), based on dry weight of the antiredeposition agent, of structural units of formula II (II)

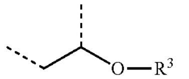

wherein each $R^3$ is independently selected from a hydrogen and a —$C(O)CH_3$ group; and (c) 10 to 65 wt % (preferably, 20 to 60 wt %; more preferably, 20 to 50 wt %; still more preferably, 25 to 40 wt %; most preferably, 25 to 35 wt %) (preferably, ≥20 wt %; more preferably, ≥25 wt %; preferably, ≤60 wt %; more preferably, ≤50 wt %; still more preferably, ≤40 wt %; most preferably, ≤35 wt %), based on dry weight of the antiredeposition agent, of structural units of formula III (III)

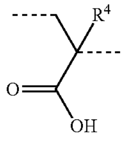

wherein each $R^4$ is independently selected from a hydrogen and a —$CH_3$ group; wherein at least one of $R^1$ and $R^2$ is a $C_{1-3}$ alkyl group in at least 1 mol % of the structural units of formula I in the antiredeposition agent; wherein the antiredeposition agent has a lactone end group and wherein the antiredeposition agent has a weight average molecular weight of 1,500 to 6,000 Daltons (preferably, 1,500 to <5,000 Daltons; more preferably, 1,750 to 4,500 Daltons; most preferably, 2,250 to 4,250 Daltons).

Preferably, the laundry detergent formulation of the present invention comprises 5 to 50 wt %, based on weight of the laundry detergent formulation, of a detergent surfactant. More preferably, the laundry detergent formulation of the present invention, comprises 6 to 30 wt %, based on weight of the laundry detergent formulation, of a detergent surfactant. Still more preferably, the laundry detergent formulation of the present invention comprises 7 to 20 wt %, based on weight of the laundry detergent formulation, of a detergent surfactant. Most preferably, the laundry detergent formulation of the present invention comprises 8 to 18 wt %, based on weight of the laundry detergent formulation, of a detergent surfactant.

Preferable, the laundry detergent formulation of the present invention comprises ≥5 wt % (preferably, ≥6 wt %; more preferably, ≥7 wt %; most preferably, ≥8 wt %), based on weight of the laundry detergent formulation, of a detergent surfactant.

Preferably, the powder laundry detergent formulation of the present invention comprises ≤50 wt % (preferably, ≤30 wt %; more preferably, ≤20 wt %; most preferably, ≤18 wt %), based on weight of the laundry detergent formulation, of a detergent surfactant.

Preferably, the detergent surfactant used in the laundry detergent formulation of the present invention is selected from the group consisting of anionic surfactants, nonionic surfactants, zwitterionic surfactants, ampholytic surfactants, cationic surfactants and mixtures thereof. More preferably, the detergent surfactant used in the laundry detergent formulation of the present invention includes a surfactant selected from the group consisting of an alkylbenzenesulfonate, an alcohol sulfate, an alcohol ethoxylate. Most preferably, the detergent surfactant used in the laundry detergent formulation of the present invention includes an anionic surfactant. Preferably, the anionic surfactant is selected from the group consisting of an alkylbenzenesulfonate, a fatty alcohol ether sulfate and mixtures thereof. Preferably, the anionic surfactant includes an alkylbenzenesulfonate. More preferably, the anionic surfactant includes a linear alkylbenzenesulfonate. Most preferably, the anionic surfactant includes a linear $C_{10-20}$ alkylbenzenesulfonate.

Preferably, the laundry detergent formulation of the present invention comprises 20 to 75 wt %, based on weight of the laundry detergent formulation, of a builder. More preferably, the laundry detergent formulation of the present invention, comprises 20 to 65 wt %, based on weight of the laundry detergent formulation, of a builder. Still more preferably, the laundry detergent formulation of the present invention comprises 25 to 50 wt %, based on weight of the laundry detergent formulation, of a builder. Most preferably, the laundry detergent formulation of the present invention comprises 27 to 35 wt %, based on weight of the laundry detergent formulation, of a builder.

Preferably, the powder laundry detergent formulation of the present invention comprises ≥20 wt % (preferably, ≥25 wt %; more preferably, ≥27 wt %), based on weight of the laundry detergent formulation, of a builder.

Preferably, the powder laundry detergent formulation of the present invention comprises ≤75 wt % (preferably, ≤65 wt %; more preferably, ≤50 wt %; most preferably, ≤35 wt %), based on weight of the laundry detergent formulation, of a builder.

Preferably, the builder used in the laundry detergent formulation of the present invention is selected from organic and inorganic materials conventionally used as builders in powder laundry detergents. Preferably, the builder used in the laundry detergent formulation of the present invention is selected from the group consisting of hydratable alkali metal phosphates, alkalis (including carbonates and bicarbonates), zeolites, ethylenediaminetetraacetate, nitrilotriacetate and mixtures thereof. More preferably, the builder used in the laundry detergent formulation of the present invention includes at least one of zeolite, sodium triphosphate, sodium tripolyphosphate, sodium citrate, sodium silicate, sodium carbonate, calcium carbonate, sodium bicarbonate and calcium bicarbonate. Most preferably, the builder used in the laundry detergent formulation of the present invention includes at least one of zeolite, sodium tripolyphosphate, sodium carbonate and calcium carbonate.

Preferably, the laundry detergent formulation of the present invention comprises an antiredeposition agent. More preferably, the laundry detergent formulation of the present invention comprises 0.01 to 5 wt % (preferably, 0.05 to 2 wt %; more preferably, 0.1 to 1.5 wt %; most preferably, 0.4 to 1.1 wt %), based on weight of the laundry detergent formulation, of an antiredeposition agent. Most preferably, the laundry detergent formulation of the present invention comprises 0.01 to 5 wt % (preferably, 0.05 to 2 wt %; more preferably, 0.1 to 1.5 wt %; most preferably, 0.4 to 1.1 wt %), based on weight of the laundry detergent formulation, of an antiredeposition agent; wherein the antiredeposition agent is a polymer comprising: (a) 10 to 65 wt %, based on dry weight of the antiredeposition agent, of structural units of formula I, wherein each $R^1$ and $R^2$ is independently selected from a hydrogen and a $C_{1-3}$ alkyl group; (b) 10 to 80 wt %, based on dry weight of the antiredeposition agent, of structural units of formula II, wherein each $R^3$ is independently selected from a hydrogen and a —$C(O)CH_3$ group; and (c) 10 to 65 wt %, based on dry weight of the antiredeposition agent, of structural units of formula III, wherein each $R^4$ is independently selected from a hydrogen and a —$CH_3$ group; wherein at least one of $R^1$ and $R^2$ is a $C_{1-3}$ alkyl group in at least 1 mol % of the structural units of formula I in the antiredeposition agent; wherein the antiredeposition agent has a lactone end group and wherein the antiredeposition agent has a weight average molecular weight of 1,500 to 6,000 Daltons.

Preferably, the antiredeposition agent used in the laundry detergent formulation of the present invention comprises 10 to 65 wt % (preferably, 20 to 60 wt %; more preferably, 20 to 50 wt %; still more preferably, 25 to 40 wt %; most preferably, 25 to 35 wt %) (preferably, ≥20 wt %; more preferably, ≥25 wt %; preferably, ≤60 wt %; more preferably, ≤50 wt %; still more preferably, ≤40 wt %; most preferably, ≤35 wt %), based on dry weight of the antiredeposition agent, of structural units of formula I (I)

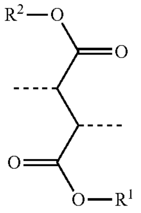

wherein each $R^1$ and $R^2$ is independently selected from a hydrogen and a $C_{1-3}$ alkyl group (preferably, a hydrogen and a $C_{2-3}$ alkyl group; more preferably, a hydrogen and a $C_3$ alkyl group). More preferably, the antiredeposition agent used in the laundry detergent formulation of the present invention comprises 10 to 65 wt % (preferably, 20 to 60 wt %; more preferably, 20 to 50 wt %; still more preferably, 25 to 40 wt %; most preferably, 25 to 35 wt %) (preferably, ≥20 wt %; more preferably, ≥25 wt %; preferably, ≤60 wt %; more preferably, ≤50 wt %; still more preferably, ≤40 wt %; most preferably, ≤35 wt %), based on dry weight of the antiredeposition agent, of structural units of formula I; wherein at least one of $R^1$ and $R^2$ is a $C_{1-3}$ alkyl group (preferably, a $C_{2-3}$ alkyl group; more preferably, a $C_3$ alkyl group) in at least 1 mol % (preferably, 1 to 20 mol %; more preferably, 1 to 15 mol %; still more preferably, 2.5 to 12 mol %; most preferably, 5 to 10 mol %) of the structural units of formula I in the antiredeposition agent. Most preferably, the antiredeposition agent used in the laundry detergent formulation of the present invention comprises 10 to 65 wt % (preferably, 20 to 60 wt %; more preferably, 20 to 50 wt %; still more preferably, 25 to 40 wt %; most preferably, 25 to 35 wt %) (preferably, ≥20 wt %; more preferably, ≥25 wt %; preferably, ≤60 wt %; more preferably, ≤50 wt %; still more preferably, ≤40 wt %; most preferably, ≤35 wt %), based on dry weight of the antiredeposition agent, of structural units of formula I; wherein at least one of $R^1$ and $R^2$ is a $C_3$ alkyl group in at least 1 mol % (preferably, 1 to 20 mol %; more preferably, 1 to 15 mol %; still more preferably, 2.5 to 12 mol %; most preferably, 5 to 10 mol %) of the structural units of formula I in the antiredeposition agent.

Preferably, the antiredeposition agent used in the laundry detergent formulation of the present invention comprises 10 to 80 wt % (preferably, 15 to 60 wt %; more preferably, 20 to 55 wt %; most preferably, 30 to 50 wt %) (preferably, ≥20 wt %; more preferably, ≥25 wt %; still more preferably, ≥30 wt %; most preferably, ≥35 wt %; preferably, ≤60 wt %; more preferably, ≤55 wt %; most preferably, ≤50 wt %), based on dry weight of the antiredeposition agent, of structural units of formula II (II)

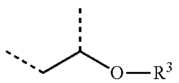

wherein each $R^3$ is independently selected from a hydrogen and a —C(O)$CH_3$ group. More preferably, the antiredeposition agent used in the laundry detergent formulation of the present invention comprises 10 to 80 wt % (preferably, 15 to 60 wt %; more preferably, 20 to 55 wt %; most preferably, 30 to 50 wt %) (preferably, ≥20 wt %; more preferably, ≥25 wt %; still more preferably, ≥30 wt %; most preferably, ≥35 wt %; preferably, ≤60 wt %; more preferably, ≤55 wt %; most preferably, ≤50 wt %), based on dry weight of the antiredeposition agent, of structural units of formula II; wherein $R^3$ is a hydrogen in 0 to 50 mol % of the structural units of formula II in the antiredeposition agent.

Preferably, the antiredeposition agent used in the laundry detergent formulation of the present invention comprises 10 to 65 wt % (preferably, 10 to 60 wt %; more preferably, 15 to 50 wt %; still more preferably, 20 to 40 wt %; most preferably, 25 to 35 wt %) (preferably, ≥10 wt %; more preferably, ≥15 wt %; preferably, ≤60 wt %; more preferably, ≤50 wt %; still more preferably, ≤40 wt %; most preferably, ≤35 wt %), based on dry weight of the antiredeposition agent, of structural units of formula III (III)

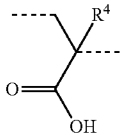

wherein each $R^4$ is independently selected from a hydrogen and a —$CH_3$ group. More preferably, the antiredeposition agent used in the laundry detergent formulation of the present invention comprises 10 to 65 wt % (preferably, 10 to 60 wt %; more preferably, 15 to 50 wt %; still more preferably, 20 to 40 wt %; most preferably, 25 to 35 wt %) (preferably, ≥10 wt %; more preferably, ≥15 wt %; preferably, ≤60 wt %; more preferably, ≤50 wt %; still more preferably, ≤40 wt %; most preferably, ≤35 wt %), based on dry weight of the antiredeposition agent, of structural units of formula III; wherein each $R^4$ is a hydrogen in 75 to 100 mol % (preferably, 85 to 100 mol %; more preferably, 95 to 100 mol %; still more preferably, ≥99 mol %; most preferably, 100 mol %) of the structural units of formula III in the antiredeposition agent.

Preferably, the antiredeposition agent used in the laundry detergent formulation of the present invention has a lactone end group. Preferably, the lactone end group is one produced by an internal esterification reaction between a carboxylic acid group on a structural unit of formula III and a terminal hydroxy group derived from a chain transfer agent. Most preferably, the lactone end group is a γ-lactone.

Preferably, the antiredeposition agent used in the laundry detergent formulation of the present invention has a formula IV (IV)

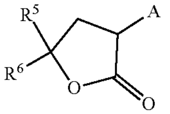

wherein A is a polymer chain comprising structural units of formula I, structural units of formula II and structural units of formula III; wherein $R^5$ and $R^6$ are independently selected from a hydrogen and a $C_{1-4}$ alkyl group. Most preferably, the antiredeposition agent used in the laundry detergent formulation of the present invention has a formula IV, wherein A is a polymer chain comprising the structural units of units of formula I, structural units of formula II and structural units of formula III; wherein $R^5$ is methyl; and wherein $R^6$ is methyl.

Preferably, the antiredeposition agent used in the laundry detergent formulation of the present invention has a weight average molecular weight of 1,500 to 6,000 Daltons. More preferably, the antiredeposition agent used in the laundry detergent formulation of the present invention has a weight average molecular weight of 1,500 to <5,000 Daltons. Still more preferably, the antiredeposition agent used in the laundry detergent formulation of the present invention has a weight average molecular weight of 1,750 to 4,500 Daltons. Most preferably, the antiredeposition agent used in the laundry detergent formulation of the present invention has a weight average molecular weight of 2,250 to 4,250 Daltons.

Preferably, the antiredeposition agent used in the laundry detergent formulation of the present invention comprises ≤8 wt % (preferably, ≤5 wt %; more preferably, ≤3 wt %; most preferably, ≤1 wt %), based on dry weight of the antiredeposition agent, of structural units of esters of (meth)acrylic acid.

Preferably, the antiredeposition agent used in the laundry detergent formulation of the present invention comprises ≤0.3 wt % (more preferably, ≤0.1 wt %; still more preferably, ≤0.05 wt %; yet still more preferably, ≤0.03 wt %; most preferably, ≤0.01 wt %), based on dry weight of the antiredeposition agent, of structural units of multi-ethylenically unsaturated crosslinking monomer.

Preferably, the antiredeposition agent used in the laundry detergent formulation of the present invention comprises ≤1 wt % (preferably, ≤0.5 wt %; more preferably, ≤0.001 wt %; still more preferably, ≤0.0001 wt %; most preferably, < the detectable limit), based on dry weight of the antiredeposition agent, of structural units of sulfonated monomer. More preferably, the antiredeposition agent used in the laundry detergent formulation of the present invention comprises ≤1 wt % (preferably, ≤0.5 wt %; more preferably, ≤0.001 wt %; still more preferably, ≤0.0001 wt %; most preferably, < the detectable limit), based on dry weight of the antiredeposition agent, of structural units of sulfonated monomer selected from the group consisting of 2-acrylamido-2-methylpropane sulfonic acid (AMPS), 2-methacrylamido-2-methylpropane sulfonic acid, 4-styrenesulfonic acid, vinylsulfonic acid, 3-allyloxy sulfonic acid, 2-hydroxy-1-propane sulfonic acid (HAPS), 2-sulfoethyl(meth)acrylic acid, 2-sulfopropyl (meth)acrylic acid, 3-sulfopropyl(meth)acrylic acid, 4-sulfobutyl(meth)acrylic acid and salts thereof. Most preferably, the antiredeposition agent used in the laundry detergent formulation of the present invention comprises ≤1 wt % (preferably, ≤0.5 wt %; more preferably, ≤0.001 wt %; still more preferably, ≤0.0001 wt %; most preferably, < the detectable limit), based on dry weight of the antiredeposition agent, of structural units of 2-acrylamido-2-methylpropane sulfonic acid (AMPS) monomer.

Preferably, the antiredeposition agent used in the laundry detergent formulation of the present invention is produced by solution polymerization. Preferably, the antiredeposition agent is a random copolymer. Preferably, the solvent used in the synthesis of the antiredeposition agent is selected from aqueous 2-propanol, aqueous ethanol, anhydrous 2-propanol, anhydrous ethanol and mixtures thereof.

Preferably, the antiredeposition agent used in the laundry detergent formulation of the present invention is provided in the form of a water-soluble solution polymer, a slurry, a dried powder, granules or another solid form.

Preferably, the laundry detergent formulation of the present invention, further comprises at least one optional ingredient selected from the group consisting of bleaching agents, bleach activators, stabilizers, foam regulators, enzymes, optical brighteners, fillers, processing aids and fragrances.

Preferably, the laundry detergent formulation of the present invention, further comprises 0 to 10 wt %, based on weight of the laundry detergent formulation, of a bleaching agent. Preferred bleaching agents include, for example, sodium perborate and sodium percarbonate.

Preferably, the laundry detergent formulation of the present invention, further comprises 0 to 10 wt %, based on weight of the laundry detergent formulation, of a bleach activator. Preferred bleach activators include, for example, tetra acetyl ethylene diamine (TAED) and sodium nonanoyloxybenzene sulfonate (NOBS).

Preferably, the laundry detergent formulation of the present invention, further comprises 0 to 1 wt %, based on weight of the laundry detergent formulation, of a stabilizer. Preferred stabilizers include, for example, phosphonates.

Preferably, the laundry detergent formulation of the present invention, further comprises 0 to 2 wt %, based on weight of the laundry detergent formulation, of an enzyme. Preferred enzymes include, for example, protease, cellulase, amylase and lipase.

Preferably, the laundry detergent formulation of the present invention, further comprises 0 to 0.3 wt %, based on weight of the laundry detergent formulation, of an optical brightener. Preferred optical brighteners include, for example, fluorescent whitening agents.

Preferably, the laundry detergent formulation of the present invention, further comprises 0 to 74.09 wt % (preferably, 0.1 to 74.09 wt %; more preferably, 5 to 70 wt %; still more preferably, 28.5 to 65 wt %; most preferably, 53.9 to 62 wt %), based on weight of the laundry detergent formulation of a filler. More preferably, the laundry detergent formulation of the present invention, further comprises 0 to 74.09 wt % (preferably, 0.1 to 74.09 wt %; more preferably, 5 to 70 wt %; still more preferably, 28.5 to 65 wt %; most preferably, 53.9 to 62 wt %), based on weight of the laundry detergent formulation of a filler; wherein the filler includes at least one of sodium sulfate, sodium chloride, calcite and dolomite. Most preferably, the laundry detergent formulation of the present invention, further comprises 0 to 74.09 wt % (preferably, 0.1 to 74.09 wt %; more preferably, 5 to 70 wt %; still more preferably, 28.5 to 65 wt %; most preferably, 53.9 to 62 wt %), based on weight of the laundry detergent formulation of a filler; wherein the filler is selected from the group consisting of sodium sulfate, sodium chloride, calcite, dolomite and mixtures thereof.

Preferably, the laundry detergent formulation of the present invention is a powder laundry detergent produced by well known manufacturing methods. For example, the laundry detergent formulation of the present invention may be produced using techniques including spray drying and dry mixing of various combinations of the components.

Preferably, the method of washing a soiled fabric article of the present invention, comprises: providing a soiled fabric article (preferably, wherein the soiled fabric article comprises cotton; more preferably, wherein the soiled fabric article is selected from cotton and a polyester cotton blend); providing a wash water; providing a rinse water; providing a laundry detergent formulation of the present invention; applying the wash water and the laundry detergent formulation to the soiled fabric article to provide a washed fabric article; and then rinsing the washed fabric article with the rinse water.

Preferably, in the method of washing a soiled fabric article of the present invention, the soiled fabric article is treated with the laundry detergent formulation and the wash water using well known techniques. Preferably, the laundry detergent formulation is mixed with the wash water at a weight ratio of laundry detergent formulation to wash water of 1:100 to 1:1,000.

Some embodiments of the present invention will now be described in detail in the following Examples.

The weight average molecular weight, $M_W$; number average molecular weight, $M_N$; and polydispersity (PDI) values reported in the Examples were measured by gel permeation chromatography (GPC) on an Agilent 1100 series LC system equipped with an Agilent 1100 series refractive index. Samples were dissolved in HPCL grade THF/FA mixture (100:5 volume/volume ratio) at a concentration of approximately 9 mg/mL and filtered through at 0.45 μm syringe filter before injection through a 4.6×10 mm Shodex KF guard column, a 8.0×300 mm Shodex KF 803 column, a 8.0×300 mm Shodex KF 802 column and a 8.0×100 mm Shodex KF-D column. A flow rate of 1 mL/min and temperature of 40° C. were maintained. The columns were calibrated with narrow molecular weight PS standards (Easi-Cal PS-2, Polymer Laboratories, Inc.).

Comparative Example CS1: Synthesis of Antiredeposition Agent

A 4-neck, one liter round bottom flask, equipped with overhead stirrer, Claisen head, septa inlet, and thermometer was charged with 225.0 g of methyl ethyl ketone (MEK) and flushed with nitrogen. The solution was heated to 80° C. and 0.45 g t-butyl peroxypivalate (75 wt % in mineral spirits) was added. A premixed homogenous solution of 73.50 g of vinyl acetate, 82.41 g of maleic anhydride and 30.50 g acrylic acid was added, via a pump, over 2 hours, followed by a 4.5 g wash with MEK. Separately, a solution of 7.0 g t-butyl peroxypivalate (75 wt % in mineral spirits) diluted to 9.0 g with MEK was also added via a syringe pump over 2 hours. A solution of 4.1 g methyl 3-mercaptopropionate diluted to 9 g with MEK was also added via a syringe pump over 2 hours. The polymer produced in this manner was subject to solvent exchange with water using a Dean Stark trap. A portion of 368 g of water was added over one hour, while a total of 281 grams of IPA-water distillate was removed. The weight average molecular weight, $M_W$, of the polymer product was then measured with the results provided in TABLE 1.

Example S1: Synthesis of Antiredeposition Agent

To a glass reactor contained within a stainless steel jacket equipped with an overhead stirrer, a nitrogen bubbler, a pressure controller, a reflux condenser and a temperature controller was added a mixture of 2-propanol (825 g) and deionized water (275 g). Then maleic anhydride (1,940 g) was added to the reactor. Then a second mixture of 2-propanol (4,561 g) and deionized water (1,518 g) was added to the reactor. The temperature controller set point was set at 70° C. The overhead stirrer was set at 250 rpm. After the maleic anhydride dissolved, the temperature controller set point was raised to 80° C. When the temperature of the reactor contents reached 75° C., the reactor was capped and the pressure controller was set to provide a pressure on the reactor contents of 30 psig. Then the addition to the reactor contents of a catalyst solution of tert-butyl peroxypivilate (444 g) in 2-propanol (1,036 g) was initiated with a flow rate of 6.98 g/min. Then 2 minutes after initiation of the catalyst solution charge, the addition to the reactor contents of a monomers glacial acrylic acid (1,940 g) and vinyl acetate (2,566 g) was initiated with flow rates of 10.78 g/min (over 180 minutes) and 21.38 g/min (over 120 minutes) respectively. Upon completion of the monomer feed, the transfer lines were rinsed into the reactor contents with 2-propanol (242 g). Upon completion of the catalyst feed, the transfer lines were rinsed into the reactor contents with 2-propanol (242 g). After completion of the catalyst solution addition, the reactor contents were held for 30 minutes, after which the temperature controller was shut down and the reactor contents were allowed to cool. When the temperature of the reactor contents dropped to 70° C., the reactor was depressurized to atmospheric pressure. When the temperature of the reactor contents dropped to 40° C., the reactor contents were filtered through a 100 mesh bag. The polymer product obtained was then measured at 48.9 wt % solids. A 1,000 g portion polymer product was then subjected to solvent exchange with water using a Dean Stark trap. A portion of 500 g of water was added over one hour, while a total of 709 g of IPA-water distillate was removed. A 50% NaOH solution was added to achieve a final pH of 6.02. The weight average molecular weight, $M_W$, of the polymer product was then measured with the results provided in TABLE 1.

TABLE 1

| | Monomer Feed composition (wt %) | | | |
|---|---|---|---|---|
| Example | Maleic anhydride | Vinyl Acetate | Acrylic Acid | Weight average molecular weight |
| Comp. CS1 | 44.2 | 39.4 | 16.4 | 9,123 Daltons |
| S1 | 30 | 40 | 30 | 3,807 Daltons |

Comparative Example CP1-CP2 and Example P1: Stock Polymer Solutions

A stock polymer solution was prepared in Comparative Example CP1 by adding to 99 g of water in a beaker, 1 g of the polymer prepared according to Comparative Example CS1. A stock polymer solution was prepared in Comparative Example CP2 by diluting to 1 wt % solids a polyacrylic acid dispersant solution (Acusol™ 445 N dispersant solution available from The Dow Chemical Company). A stock polymer solution was prepared in Example P1 by adding to 99 g of water in a beaker, 1 g of the polymer prepared according to Example S1.

Hardness Tolerance

The hard water tolerance of the polymers prepared according to Comparative Example CP1, Example P1 and the polyacrylic acid dispersant solution of Comparative Example CP2 were evaluated by adding magnetic stir bars to the beakers containing the stock solutions prepared according to Comparative Examples CP1-CP2 and Example P1 and placing the beakers on a magnetic stir plate. The pH of both stock solutions were adjusted to 10 by adding sodium hydroxide as necessary. Using an immersion colorimeter probe, the initial transmittance of each solution was measured and recorded. At time=0, 100 ppm of a hardness solution (0.1 g of a 2 Ca:1 Mg) was added to each stock solution. The stock solutions were left to stir for 1 minute. At time=1 minute, the transmittance of each solution was measured and recorded. Then an additional 100 ppm of hardness solution was added. One minute following the hardness solution addition, the transmittance was measured and recorded. This process was repeated until time=20 minutes or until the transmittance of a given solution fell below 40%. The results are provided in TABLE 2.

TABLE 2

| | Added $CaCO_3$ | % transmittance through polymer solution | | |
|---|---|---|---|---|
| Time (min) | Hardness (ppm mass) | Comp. Ex. CP1 | Comp. Ex. CP2 | Ex. P1 |
| 0 | 0 | 100.0 | 100.0 | 100.0 |
| 1 | 100 | 100.0 | 100.0 | 100.0 |
| 2 | 200 | 100.0 | 100.0 | 100.0 |
| 3 | 300 | 99.9 | 99.9 | 100.0 |
| 4 | 400 | 96.1 | 99.9 | 100.0 |
| 5 | 500 | 74.7 | 99.9 | 100.0 |
| 6 | 600 | 48.9 | 99.9 | 100.0 |
| 7 | 700 | 27.2 | 99.8 | 100.0 |
| 8 | 800 | — | 99.2 | 100.0 |
| 9 | 900 | — | 93.1 | 99.9 |
| 10 | 1,000 | — | 82.0 | 99.8 |
| 11 | 1,100 | — | 68.2 | 99.7 |

TABLE 2-continued

| | Added $CaCO_3$ | % transmittance through polymer solution | | |
|---|---|---|---|---|
| Time (min) | Hardness (ppm mass) | Comp. Ex. CP1 | Comp. Ex. CP2 | Ex. P1 |
| 12 | 1,200 | — | 55.9 | 99.6 |
| 13 | 1,300 | — | 46.4 | 99.5 |
| 14 | 1,400 | — | 39.6 | 99.4 |
| 15 | 1,500 | — | — | 99.3 |
| 16 | 1,600 | — | — | 99.2 |
| 17 | 1,700 | — | — | 99.2 |
| 18 | 1,800 | — | — | 99.0 |
| 19 | 1,900 | — | — | 99.0 |
| 20 | 2,000 | — | — | 98.9 |

TABLE 3

| Base Detergent Composition | |
|---|---|
| Ingredient | (wt %) |
| Linear alkyl benzene sulfonate (90%) | 10.00 |
| Soda Ash Light (Soda Carbonate) | 30.00 |
| Whitening agent[1] | 0.04 |
| Sodium Sulphate | 9.00 |
| Perfume | 0.30 |
| Calcite | 12.00 |
| Dolomite | 14.00 |
| NaCl | 24.66 |

[1]Tinopal CBSX fluorescent whitening agent available from BASF

Comparative Examples C1-C4 and Examples 1-3: Laundry Detergent Composition

Powder laundry detergent formulations were prepared in each of Comparative Examples C1-C4 and Examples 1-3 having the composition set forth in TABLE 4.

TABLE 4

| | (wt %) | | | | | | |
|---|---|---|---|---|---|---|---|
| Ingredient | C1 | C2 | C3 | C4 | 1 | 2 | 3 |
| Base Detergent Composition | 100 | 99 | 99 | 99 | 99.5 | 99.25 | 99 |
| Poly(acrylic acid)[1] | — | 1.0 | — | — | — | — | — |
| Poly(acrylic acid co-maleic acid)[2] | — | — | 1.0 | — | — | — | — |
| Carboxylated polyelectrolyte copolymer[3] | — | — | — | 1.0 | — | — | — |
| Product Example S1 | — | — | — | — | 0.5 | 0.75 | 1.0 |

[1]Acusol™ 445G poly(acrylic acid) homopolymer having a weight average molecular weight, $M_W$, of 4,500 Daltons available from The Dow Chemical Company

[2]Acusol™ 479A poly(acryic acid co-maleic acid) copolymer having a weight average molecular weight, $M_W$, of 70,000 Daltons available from The Dow Chemical Company

[3]Acusol™ 460N carboxylated polyelectrolyte copolymer having a weight average molecular weight, $M_W$, of 10,000 Daltons available from The Dow Chemical Company Primary Cleaning Performance Test The primary cleaning performance of the liquid laundry detergent formulations of Comparative Examples C1-C4 and Examples 1-3 were assessed on white cotton fabric in a Tergotometer Model 7243ES at a set test temperature of 28° C. using a 30 minute soak cycle followed by a 15 min wash cycle at 80 rpm having a liquor to cloth ratio of 50. The washed fabrics were rinsed in a Tergotometer at 300 ppm (2/1 $Ca^{2+}/Mg^{2+}$) hardness adjusted water at ambient temperature for 2 mins, twice at 80 rpm. The stained fabrics and soiled ballasts used in the tests were WFK 10 D pigment/sebum on cotton, WFK 20D pigment/sebum on 65 polyester/35 Cotton and garden soil Testfabrics directly into the pot of the Tergotometer. The stained swatches were 10 cm×10 cm. The water hardness used for the studies was adjusted to 300 ppm as $CaCO_3$ (2:1 $Ca^{2+}:Mg^{2+}$ molar ratio) and checked by EDTA titration to confirm. The total surfactant concentration in the wash liquor was 0.5 g/L.

Reflectance Measurement and Stain Removal

The fabrics were laundered for 1 cycle and the reflectance value was measured at 460 nm using a Macbeth Color Eye Spectrophotometer to determine the difference in reflectance value before and after wash. The change in reflectance value (delta R460) for each of the powder laundry formulations is provided in TABLE 5.

TABLE 5

| Example | Delta in Reflectance value (delta R460) | | |
|---|---|---|---|
| | WFK 10D | WFK 20D | Garden Soil |
| Comp. Ex. C1 | 16.00 | 18.02 | 26.93 |
| Comp. Ex. C2 | 22.24 | 24.36 | 30.85 |
| Comp. Ex. C3 | 20.94 | 20.85 | 25.60 |
| Comp. Ex. C4 | 21.12 | 27.61 | 26.67 |
| Example 1 | 18.84 | 20.11 | 27.76 |
| Example 2 | 21.92 | 23.86 | 28.12 |
| Example 3 | 23.49 | 25.68 | 35.05 |

Antiredeposition

The antiredeposition performance of the laundry detergent formulations of Comparative Examples C1-C2 and Example 3 were assessed in a Terg-o-tometer Model 7243ES agitated at 90 cycles per minute with the conditions noted in TABLE 6.

TABLE 6

| Parameter | Setting |
|---|---|
| Temperature | 25° C. |
| Water hardness | 300 ppm, $Ca^{2+}/Mg^{2+}$ = 2/1 |
| Fabric Type | Cotton<br>two cloths of each type in each pot |
| Wash time | 12 minutes |
| Rinse time | 2 minutes, twice |
| Laundry detergent dosage | 5 g/L |
| Anti-redeposition soils | Iron (III) oxide of particle size less than 10 microns |
| Drying | After final rinse, fabrics were dried in a dryer for 45 minutes |

The fabrics were laundered for 3 consecutive cycles and the Ganz Whiteness Index was determined as indicated in TABLE 7.

TABLE 7

| Example | Ganz Whiteness Index |
|---|---|
| Comparative Example C1 | 101 |
| Comparative Example C2 | 114.4 |
| Example 3 | 115.3 |

TABLE 8

| Base Detergent Composition | |
|---|---|
| Ingredient | (wt %) |
| Linear alkyl benzene sulfonate (90%) | 17.00 |
| Soda Ash Light (Soda Carbonate) | 34.00 |
| Whitening agent[1] | 0.05 |
| Sodium Sulphate | 9.00 |
| Perfume | 0.30 |
| Calcite | 8.00 |
| Dolomite | 9.00 |
| NaCl | 22.65 |

[1]Tinopal CBSX fluorescent whitening agent available from BASF

Comparative Examples C5-C8 and Examples 4-6: Laundry Detergent Composition

Powder laundry detergent formulations were prepared in each of Comparative Examples C5-C8 and Examples 4-6 having the composition set forth in TABLE 9.

TABLE 9

| Ingredient | (wt %) | | | | | | |
|---|---|---|---|---|---|---|---|
| | C5 | C6 | C7 | C8 | 4 | 5 | 6 |
| Base Detergent Composition | 100 | 99 | 99 | 99 | 99.5 | 99.25 | 99 |
| Poly(acrylic acid)[1] | — | 1.0 | — | — | — | — | — |
| Poly(acrylic acid co-maleic acid)[2] | — | — | 1.0 | — | — | — | — |
| Carboxylated polyelectrolyte copolymer[3] | — | — | — | 1.0 | — | — | — |
| Product Example S1 | — | — | — | — | 0.5 | 0.75 | 1.0 |

[1]Acusol ™ 445G poly(acrylic acid) homopolymer having a weight average molecular weight, $M_W$, of 4,500 Daltons available from The Dow Chemical Company

[2]Acusol ™ 479A poly(acryic acid co-maleic acid) copolymer having a weight average molecular weight, $M_W$, of 70,000 Daltons available from The Dow Chemical Company

[3]Acusol ™ 460N carboxylated polyelectrolyte copolymer having a weight average molecular weight, $M_W$, of 10,000 Daltons available from The Dow Chemical Company Primary Cleaning Performance Test The primary cleaning performance of the liquid laundry detergent formulations of Comparative Examples C5-C8 and Examples 4-6 were assessed on white cotton fabric in a Tergotometer Model 7243ES at a set test temperature of 28° C. using a 30 minute soak cycle followed by a 15 min wash cycle at 80 rpm having a liquor to cloth ratio of 50. The washed fabrics were rinsed in a Tergotometer at 300 ppm (2/1 $Ca^{2+}/Mg^{2+}$) hardness adjusted water at ambient temperature for 2 mins, twice at 80 rpm. The stained fabrics and soiled ballasts used in the tests were WFK 10 D pigment/sebum on cotton, WFK 20D pigment/sebum on 65 polyester/35 Cotton and garden soil Testfabrics directly into the pot of the Tergotometer. The stained swatches were 10 cm×10 cm. The water hardness used for the studies was adjusted to 300 ppm as $CaCO_3$ (2:1 $Ca^{2+}$:$Mg^{2+}$ molar ratio) and checked by EDTA titration to confirm. The total surfactant concentration in the wash liquor was 0.5 g/L.

Reflectance Measurement and Stain Removal

The fabrics were laundered for 1 cycle and the reflectance value was measured at 460 nm using a Macbeth Color Eye Spectrophotometer to determine the difference in reflectance value before and after wash. The change in reflectance value (delta R460) for each of the powder laundry formulations is provided in TABLE 10.

TABLE 10

| | Delta in Reflectance value (delta R460) | | |
|---|---|---|---|
| Example | WFK 10D | WFK 20D | Garden Soil |
| Comp. Ex. C5 | 17.26 | 22.65 | 23.65 |
| Comp. Ex. C6 | 21.88 | 31.47 | 28.69 |
| Comp. Ex. C7 | 18.44 | 30.04 | 24.33 |
| Comp. Ex. C8 | 22.87 | 33.31 | 32.13 |
| Example 4 | 19.80 | 27.12 | 25.22 |
| Example 5 | 21.03 | 28.36 | 25.24 |
| Example 6 | 21.56 | 30.45 | 27.70 |

Antiredeposition

The antiredeposition performance of the laundry detergent formulations of Comparative Examples C5-C6 and Example 6 were assessed in a Terg-o-tometer Model 7243ES agitated at 90 cycles per minute with the conditions noted in TABLE 11.

TABLE 11

| Parameter | Setting |
|---|---|
| Temperature | 25° C. |
| Water hardness | 300 ppm, $Ca^{2+}/Mg^{2+}$ = 2/1 |
| Fabric Type | Cotton<br>two cloths of each type in each pot |
| Wash time | 12 minutes |
| Rinse time | 2 minutes, twice |
| Laundry detergent dosage | 5 g/L |
| Anti-redeposition soils | Iron (III) oxide of particle size less than 10 microns |
| Drying | After final rinse, fabrics were dried in a dryer for 45 minutes |

The fabrics were laundered for 3 consecutive cycles and the Ganz Whiteness Index was determined as indicated in TABLE 12.

TABLE 12

| Example | Ganz Whiteness Index |
|---|---|
| Comparative Example C5 | 101 |
| Comparative Example C6 | 114.4 |
| Example 6 | 115.3 |

We claim:

1. A laundry detergent formulation, comprising:

a detergent surfactant;

a builder;

a filler; and an antiredeposition agent, wherein the antiredeposition agent is a polymer comprising:

(a) 10 to 65 wt % of structural units of formula I

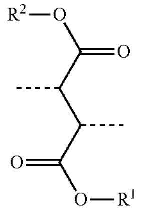

(I)

wherein each $R^1$ and $R^2$ is independently selected from a hydrogen and a $C_{1-3}$ alkyl group;

(b) 10 to 80 wt % of structural units of formula II

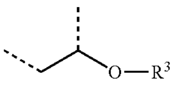

(II)

wherein each $R^3$ is independently selected from a hydrogen and a —(O) $CH_3$ group; and (c) 10 to 65 wt % of structural units of formula III

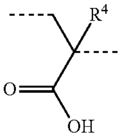

(III)

wherein each $R^4$ is independently selected from a hydrogen and a —$CH_3$ group; and wherein at least one of $R^1$ and $R^2$ is a $C_{1-3}$ alkyl group in at least 1 mol % of the structural units of formula I in the antiredeposition agent; wherein the antiredeposition agent has a lactone end group and wherein the antiredeposition agent has a weight average molecular weight of 1,500 to 6,000 Daltons.

2. The laundry detergent formulation of claim 1, wherein at least one of $R^1$ and $R^2$ is a $C_3$ alkyl group in 1 to 20 mol % of the structural units of formula I in the antiredeposition agent.

3. The laundry detergent formulation of claim 1, wherein $R^3$ is a hydrogen in 0 to 50 mol % of the structural units of formula II in the antiredeposition agent.

4. The laundry detergent formulation of claim 1, wherein the laundry detergent formulation contains less than 0.1 wt %, based on weight of the laundry detergent formulation, of phosphate, measured as elemental phosphorus.

5. The laundry detergent formulation of claim 1, wherein the lactone end group is a γ-lactone.

6. The laundry detergent formulation of claim 5, wherein the antiredeposition agent is according to formula IV

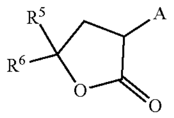

(IV)

wherein A is a polymer chain comprising the structural units of formula I, the structural units of formula II, and the structural units of formula III; wherein $R^5$ is methyl; and wherein $R^6$ is methyl.

7. The laundry detergent formulation of claim 6, wherein the laundry detergent formulation contains 8 to 20 wt % of the surfactant; wherein the detergent surfactant is a linear $C_{10-20}$ alkylbenzenesulfonate; and wherein the laundry detergent formulation contains less than 0.1 wt %, based on weight of the laundry detergent formulation, of phosphate, measured as elemental phosphorus.

8. The laundry detergent formulation of claim 7, further comprising an additive selected from the group consisting of a fragrance, optical brightener, bleaching agent, a bleach activator, an enzyme and mixtures thereof.

9. A method of washing a soiled fabric article, comprising: providing a soiled fabric article; providing a laundry detergent formulation according to claim 1; providing a wash water; providing a rinse water; applying the wash water and the laundry detergent formulation to the soiled fabric article to provide a washed fabric article; and rinsing the washed fabric article with the rinse water.

* * * * *